May 30, 1967  J. P. KOHLS  3,322,225
FORWARD AND REVERSE GUIDANCE CONTROL FOR VEHICLES
Filed Feb. 5, 1965  3 Sheets-Sheet 1

INVENTOR
JAMES P. KOHLS
BY
*Farley, Forster & Farley*
ATTORNEYS

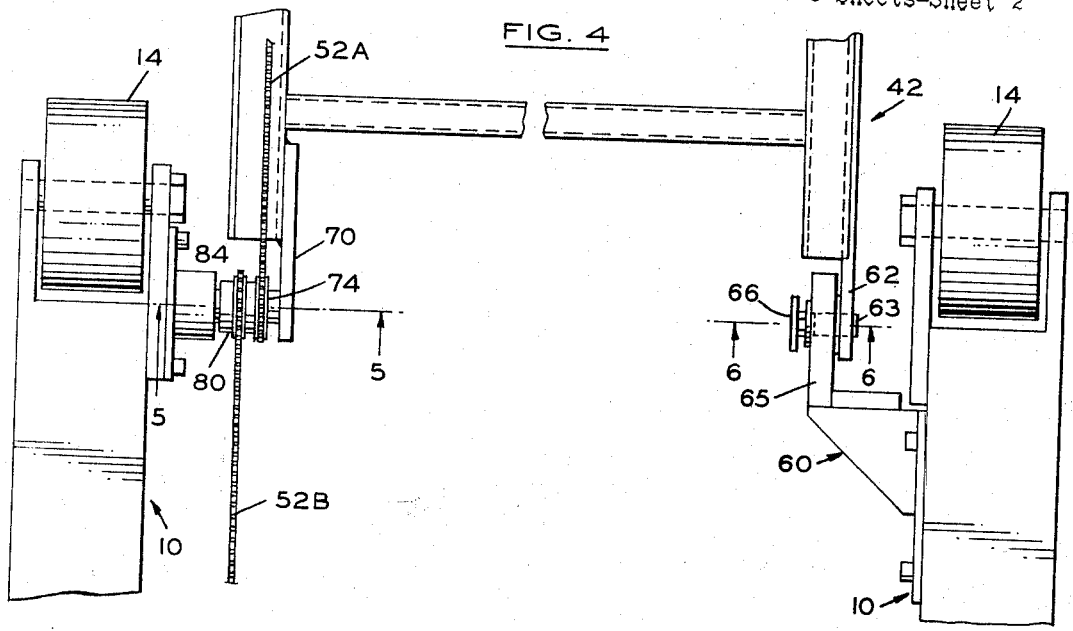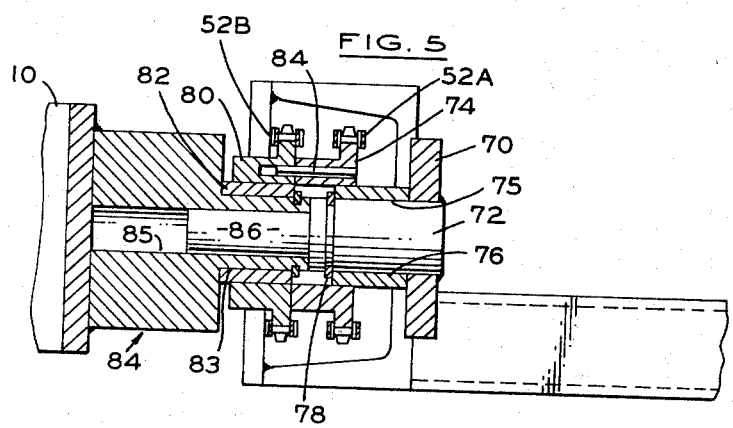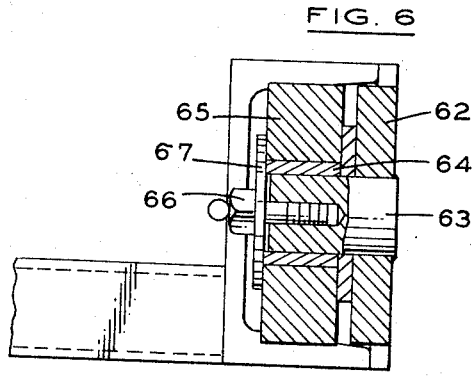

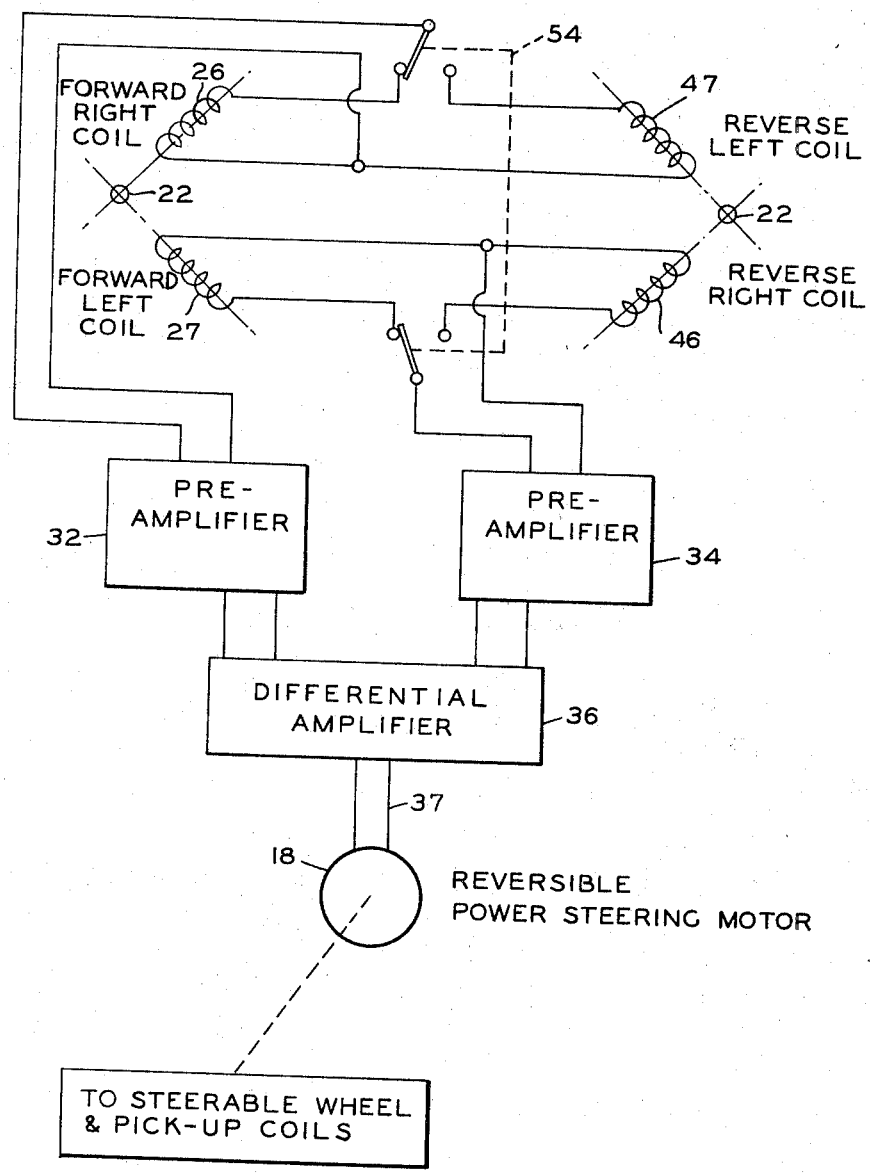

United States Patent Office 3,322,225
Patented May 30, 1967

3,322,225
FORWARD AND REVERSE GUIDANCE CONTROL FOR VEHICLES
James P. Kohls, Detroit, Mich., assignor to Jervis B. Webb Company, Detroit, Mich., a corporation of Michigan
Filed Feb. 5, 1965, Ser. No. 430,664
9 Claims. (Cl. 180—79.1)

This invention relates to an improved guidance control for a self-propelled vehicle to enable operation thereof in a reverse as well as a forward direction; and has particular application to guidance systems of the type in which the vehicle is automatically steered along a path defined by an energized conductor usually laid along or beneath the supporting surface on which the vehicle travels. An example of a guidance system of this type is disclosed in U.S. Patent 2,339,291.

A conventional guidance control includes some form of power steering mechanism connected with the dirigible wheel of the vehicle for turning it in either steering direction, left or right. Operation of the power steering mechanism is regulated by an electrical control which includes a forward direction sensing unit having means for detecting a deviation in the path of travel of the vehicle to the right or to the left of the desired path and supplying an error signal to the control which in turn energizes the power steering mechanism for corrective steering action of the dirigible wheel.

In one common arrangement, the forward direction sensing unit includes right and left direction sensing coils which are mounted for movement about a vertical pivotal axis adjacent the forward end of the vehicle and which are positioned in advance of the dirigible wheel so as to anticipate the corrective steering action and provide the feed-back necessary for a stable system, the coils being mechanically coupled with the power steering mechanism for movement about their pivotal supporting axis in an amount proportional to the steering movement of the dirigible wheel.

The objects of the present invention are to provide a guidance control for automatically steering a vehicle along a defined path which is not restricted to forward travel only but which will also function when the direction of vehicle travel is reversed; to provide a reverse steering control unit which can be employed with or added to existing forward steering control units; and to provide a reverse steering control unit which can be optionally employed, being readily attached to or removed from a vehicle as required.

All vehicles with which the invention can be utilized include a vehicle frame and a number of wheels for supporting it. Many wheel arrangements can be employed; most of these will consist of either three or four wheels; all of them will include in common at least one dirigible wheel mounted adjacent one end of the vehicle and at least one fixed wheel mounted adjacent the other end of the vehicle, and for convenience in the following description the end of the vehicle adjacent the dirigible wheel will be referred to as the forward end since this is the normal arrangement.

The invention provides a steering control for use with a vehicle having a main frame, wheel means supporting the frame including at least one dirigible wheel adjacent the forward end of the frame and a non-dirigible wheel adjacent the rear end thereof, the steering control including a forward direction sensing unit carried by the frame adjacent the forward end of the vehicle for movement about a vertical pivot on the longitudinal center line of the vehicle, a reverse direction sensing unit, means mounting the reverse direction sensing unit for movement about a vertical pivot located on the longitudinal center line of the vehicle and spaced rearwardly from the axis of the non-dirigible wheel, power steering mechanism for the dirigible wheel, driving means coupling the forward and reverse direction sensing units to the power steering mechanism for pivotally moving each of said units about its pivotal axis an amount proportional to the distance between each of said units and the axis of the non-dirigible wheel in response to operation of said steering control mechanism whereby said forward and reverse direction sensing units are capable of a corresponding direction error detecting and correcting effect relative to a vehicle turning center on the non-dirigible wheel axis, circuit means for regulating the operation of the power steering mechanism in accordance with any direction error, and means for selectively electrically connecting either one of said forward or reverse direction sensing units to said circuit means in correspondence with the direction of movement of the vehicle.

A presently preferred representative embodiment of the invention is shown in the accompanying drawings, illustrating the application of the invention for forward and reverse guidance of a three-wheeled industrial truck, and in which:

FIGURE 4 is a fragmentary plan view illustrating the attachment of the rear direction sensing unit to the frame of the truck;

FIGURES 5 and 6 are enlarged sectional views taken respectively as indicated by the lines 5—5 and 6—6 of FIG. 4; and FIGURE 7 is a schematic diagram of the forward and reverse guidance control.

Figure 1:
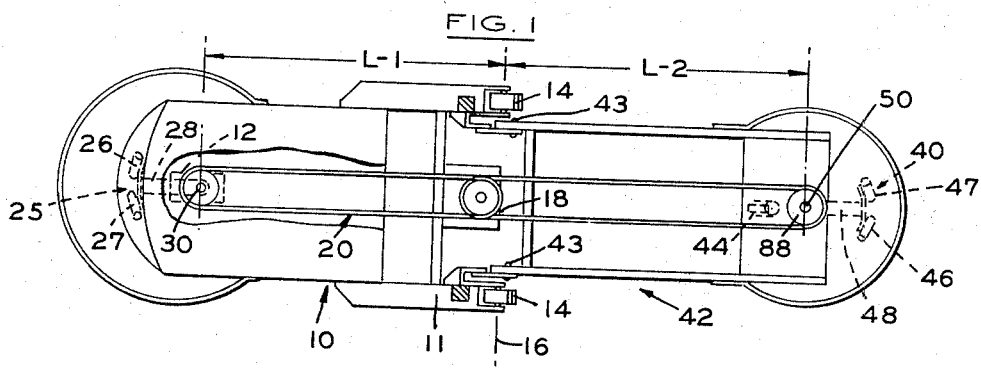
FIGURE 1 is a schematic plan view of a truck showing forward and reverse direction sensing units mounted thereon.
Figure 2:
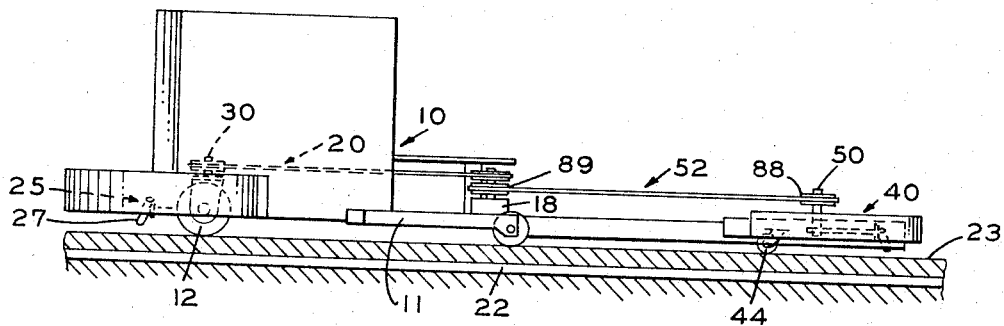
FIGURE 2 is a side elevation of the truck shown in FIG. 1.
Figure 3:
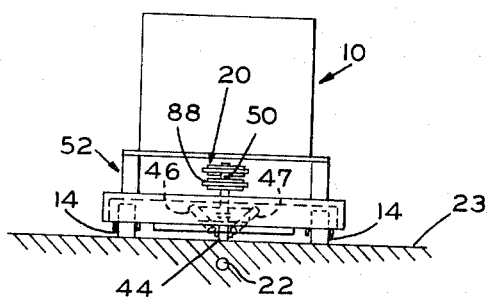
FIGURE 3 is an end elevation thereof.

The vehicle schematically shown in FIGS. 1–3 is representative of a conventional three-wheeled, self-propelled industrial truck 10, the frame 11 of which is supported by a single forward dirigible wheel 12 and a pair of rearward non-dirigible wheels 14 rotating about a common transverse axis 16. A reversible steering motor 18 is mounted on the frame and is coupled with the steering wheel 12 by a sprocket and chain connection 20. Operation of the steering motor 18 will thus cause the wheel 12 to turn either to the right or to the left, and the vehicle 10 will turn about a center located at the intersection of the rotational axis of the dirigible wheel 12 and the non-dirigible wheels 14.

Operation of the steering motor 18 is regulated by an automatic steering control, such as shown in U.S. Patent 2,339,291 so as to cause the vehicle 10, when travelling in a forward direction, to follow a path defined by an energized conductor 22 laid in or on top of the vehicle supporting surface 23. Since such a steering control is well known, it has not been shown in detail, but includes a forward direction sensing unit 24 consisting of right and left direction sensing coils 26 and 27. These direction sensing coils 26 and 27 are mounted on a suitable bracket 28 which is secured to the pivot 30 of the dirigible wheel 12 so that the bracket 28 and direction sensing coils 26 and 27 move with steering movement of the dirigible wheel 12.

Signals sensed by the right and left coils 26 and 27 regulate the operation of the steering motor 18 through a suitable control circuit such as schematically illustrated in FIG. 7. In this control circuit, the right direction sensing coil 26 is electrically connected to a pre-amplifier 32 and the left direction sensing coil 27 to a pre-amplifier 34. The pre-amplifiers 32 and 34 are electrically connected to a differential amplifier 36, the output 37 of which controls the energization of the electrical steering motor 18.

The invention enables the vehicle to be selectively guided in a reverse direction of travel utilizing the same control and steering components. A reverse direction sensing unit 40 is mounted on an extension or auxiliary frame 42 which is connected to the vehicle frame 11 by pivots 43 for relative articulation on a transverse horizontal axis and which is supported adjacent its rear end by a caster wheel 44. The reverse direction sensing unit 40 includes a right direction sensing coil 46 and a left direction sensing coil 47, these coils being supported by a suitable bracket 48 secured to a vertical shaft 50 and driven from the steering motor 18 by a sprocket and chain connection 52.

The relation between the forward direction sensing unit 25 and reverse direction sensing unit 40 is one of opposite symmetry relative to the axis 16 of the non-dirigible wheels in a physical, mechanical and electrical sense. It will be seen that the respective vertical pivots 30 and 50 about which the forward and reverse direction sensing units are driven by the steering motor 18 are spaced oppositely and equi-distant from the axis of the non-dirigible wheels 14 as shown by the distances L–1 and L–2 in FIG. 1. With this relative spacing, the same driving ratio is employed in the sprocket and chain connections 20 and 52 and the symmetry is maintained by having the respective forward and reverse unit mounting brackets 28 and 48 the same length. An opposite relation in the electrical sense is obtained by mounting the forward left direction sensing coil 27 and reverse right direction sensing coil 46 on the same side of the longitudinal center line of the vehicle, the forward right and reverse left coils 26 and 47 being mounted on the other side of the longitudinal vehicle center line.

Referring to the electrical diagram FIG. 7, a double-pole, double-throw switch 54 selectively connects either the forward right direction sensing coil 26 or reverse left direction sensing coil 47 to the preamplifier 32, and either the forward left or reverse right direction sensing coils 27, 46 to the preamplifier 34. Thus the forward and reverse direction sensing units are electrically and mechanically arranged so as to be capable of equally and oppositely detecting any deviation in the travel of the vehicle from the defined path and of anticipating any turning of the vehicle about a center located on the roational axis of its non-dirigible wheels.

In the event design requirements for a particular vehicle necessitate a departure from the arrangement of equal symmetry disclosed—for example so that the distances L–1 and L–2 are not equal—then a proportionate change will be required in the ratio between the driving connections 20 and 52, or between the relative length of the mounting brackets 28 and 48, or both. The forward and reverse sensing units must be capable of an equal and opposite error detecting and anticipating effect about the same turning center.

Those skilled in this art will recognize that equivalent means, such as hydraulic or electrical servo devices, can be employed for coupling the forward and reverse sensing units with the power steering mechanism instead of the mechanical form of coupling means shown.

Other features found in the construction disclosed include the pivotal connection between the auxiliary frame 42 and the main vehicle frame 11 and the caster wheel 44 for supporting the auxiliary frame. This insures that the sensing coils of the reverse direction sensing unit will be positioned at approximately the same vertical distance from the guide wire 22, regardless of any unevenness in the surface 23 over which the vehicle is travelling. Hence the signal strength obtainable from the sensing coils 46 and 47 of the reverse unit 40 will be substantially the same as those obtainable from the coils of the forward unit 25.

As shown in FIGS. 4–6, an easily detachable pivotal connection is preferably employed between the main and auxiliary frames 11 and 42 so that the reverse sensing unit and its supporting frame can readily be removed from the vehicle when reverse direction control is not desired. At one side of the vehicle, this connection includes a mounting bracket 60 secured to the frame 11 adjacent the rear end thereof. A bar 62 on the forward end of the auxiliary frame 42 is equipped with a pivot pin 63 which is engageable in a bushing 64 mounted on an arm 65 forming part of the bracket 60, and the parts are held in assembled relation by a single bolt and washer 66 and 67 best shown in FIG. 6.

At the other side of the vehicle, a detachable coupling in the sprocket and chain drive 52 between the reverse direction sensing unit and steering motor 18 is provided as part of the pivotal connection between the main and auxiliary frames. This construction, which is shown in detail in FIG. 5, includes a bar 70 fixed to and extending forwardly of the auxiliary frame 42 and a cylindrical combination pivot pin and axle 72 secured to the bar 70. A sprocket 74 having a bushing portion 75 is rotatably mounted on the enlarged cylindrical portion 76 of the member 72 and held in assembled relation therewith by a snap ring 78. A second sprocket 80 secured to a bushing 82 is mounted on the journal portion 83 of a fitting 84 fastened to the main frame 10, this fitting 84 including a socket 85 which slidably and pivotally receives the reduced cylindrical end portion 86 of the member 72. Sprockets 74 and 80 are connected in driving relation with each other by one or more dowels 84 carried by one of the sprockets and slidably engaging a socket in the other. The driving connection 52 between the steering motor 18 and reverse sensing unit 40 includes a chain 52a trained about the sprocket 74 and the sprocket 88 at the rear end of the vehicle, and a second chain 52b engaging the sprocket 80 and sprocket 89 on the drive motor shaft. Suitable intermediate idler sprockets are employed for guiding the chains 52a and 52b between the sprockets 74 and 80 and their respective associated sprockets 88 and 89.

This construction permits the auxiliary frame 42 and reverse sensing unit to be quickly connected to or detached from the main frame 11 by relative transverse movement between the two frames. One bolt 66 holds the frames in assembled relation.

While preferred embodiments have been described above in detail, it will be understood that numerous modifications might be resorted to without departing from the scope of the invention as defined in the following claims.

I claim:

1. A forward and reverse steering control for use with a vehicle having a main frame; longitudinally spaced dirigible and non-dirigible wheels supporting the frame; a power steering mechanism connected to the dirigible wheel; said steering control including an auxiliary frame; means connecting the auxiliary frame to the main frame for relative pivotal movement on a transverse axis, the auxiliary frame extending oppositely of the axis of the non-dirigible whel relative to the placement of the dirigible wheel with respect to such axis; wheel means for supporting the extending end of the auxiliary frame; forward and reverse direction sensing units; means mounting the forward direction sensing unit on the main frame for movement about a vertical pivotal axis spaced longitudinally of the vehicle in one direction from the non-dirigible wheel axis and mounting the reverse direction sensing unit on the auxiliary frame for movement about a vertical pivotal axis spaced longitudinally in the opposite direction from the non-dirigible wheel axis; driving means connecting the forward and reverse direction sensing units to the power steering mechanism; and circuit means selectively including one of the forward and reverse direction sensing units for regulating the operation of the power steering mechanism in accordance with any deviation of the vehicle from a defined path of travel; said mounting means, driving means and circuit means being arranged so that the forward and reverse sensing units are capable of an equal and opposite deviation detecting and anticipating effect about a vehicle turning center on the non-dirigible wheel axis.

2. A reverse steering control as claimed in claim 1 wherein said means for pivotally connecting the auxiliary frame to the main frame provides a detachable pivotal connection and wherein the driving means connecting the reverse direction sensing unit to the power steering mechanism includes a pair of sprockets rotatably mounted on the pivotal axis between the auxiliary and main frames, one of said sprockets being carried by the main frame, the other of said sprockets being carried by the auxiliary frame, and detachable coupling means for transmitting drive between said sprockets when the frames are in assembled relation.

3. A reverse steering control as claimed in claim 1 wherein said mounting means position the pivotal axes of the forward and reverse sensing units oppositely equidistant from the non-dirigible wheel axis, and wherein said driving means provides the same driving ratio between the power steering mechanism and the forward and reverse direction sensing units.

4. A steering control for use with a vehicle having a main frame, wheel means supporting the frame including at least one dirigible wheel adjacent the forward end of the frame and a non-dirigible wheel adjacent the rear end thereof, a forward direction sensing unit carried by the frame adjacent the forward end of the vehicle for movement about a vertical pivot on the longitudinal center line of the vehicle, a reverse direction sensing unit, means mounting the reverse direction sensing unit for movement about a vertical pivot located on the longitudinal center line of the vehicle and spaced rearwardly from the axis of the non-dirigible wheel, power steering mechanism for the dirigible wheel, driving means coupling the forward and reverse direction sensing units to the power steering mechanism for pivotally moving each of said units about its pivotal axis an amount proportional to the distance between each of said units and the axis of the non-dirigible wheel in response to operation of said steering control mechanism whereby said forward and reverse direction sensing units are capable of a corresponding direction error detecting and correcting effect relative to a vehicle turning center on the non-dirigible wheel axis, circuit means for regulating the operation of the power steering mechanism in accordance with any direction error, and means for selectively electrically connecting one of said forward and reverse direction sensing units to said circuit means in correspondence with the direction of movement of the vehicle.

5. A steering control for use with a vehicle having a main frame, wheel means supporting the frame including at least one dirigible wheel and a non-dirigible wheel, a forward direction sensing unit carried by the frame forwardly of the axis of rotation of the non-dirigible wheel for movement about a vertical pivot, a reverse direction sensing unit, means mounting the reverse direction sensing unit for movement about a vertical pivot spaced rearwardly from the axis of the non-dirigible wheel, power means for steering the dirigible wheel, coupling means for pivotally moving the forward and reverse direction sensing units an amount proportional to the distance between each of said units and the axis of the non-dirigible wheel in response to operation of said steering control mechanism whereby said forward and reverse direction sensing units are capable of a corresponding direction error detecting and correcting effect relative to a vehicle turning center on the non-dirigible wheel axis, and circuit means for selectively regulating the operation of the power steering mechanism in accordance with any direction error sensed by one of the direction sensing units.

6. A steering control as claimed in claim 5 wherein said coupling means for pivotally moving the forward and reverse direction sensing units comprises a sprocket and chain connection between each of said units and the means for steering the dirigible wheel.

7. A steering control as claimed in claim 5 wherein the means mounting the reverse direction sensing unit includes an auxiliary frame and means detachably connecting the auxiliary frame to the main frame.

8. A steering control as claimed in claim 5 wherein the means mounting the reverse direction sensing unit includes an auxiliary frame, means pivotally connecting the auxiliary frame to the main frame on an axis transverse to the direction of vertical movement.

9. A steering control as claimed in claim 8 further including wheel means supporting the auxiliary frame adjacent the location of the reverse direction sensing unit thereon.

References Cited
UNITED STATES PATENTS

| | | | |
|---|---|---|---|
| 2,331,144 | 10/1943 | Sitter | 180—79.1 |
| 2,339,291 | 6/1944 | Paulus et al. | 180—79.1 |
| 2,990,902 | 7/1961 | Cataldo | 180—79.2 |
| 3,029,890 | 4/1962 | Mountjoy | 180—79.1 |
| 3,085,646 | 4/1963 | Paufve | 180—82.1 |

BENJAMIN HERSH, *Primary Examiner.*

J. H. BRANNEN, *Assistant Examiner.*